United States Patent
Kim

(10) Patent No.: US 11,472,497 B2
(45) Date of Patent: Oct. 18, 2022

(54) DEVICE FOR PREVENTING JACKKNIFING USING MAGNETIC DAMPING COUPLER OF TRACTOR

(71) Applicants: Hyundai Motor Company, Seoul (KR); Kia Motors Corporation, Seoul (KR)

(72) Inventor: Hyung Mook Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 226 days.

(21) Appl. No.: 17/010,380

(22) Filed: Sep. 2, 2020

(65) Prior Publication Data

US 2021/0179208 A1 Jun. 17, 2021

(30) Foreign Application Priority Data

Dec. 16, 2019 (KR) .................. 10-2019-0168103

(51) Int. Cl.
*B62D 53/08* (2006.01)
*B60D 1/62* (2006.01)
*B60D 1/14* (2006.01)
*B60D 1/32* (2006.01)

(52) U.S. Cl.
CPC .......... *B62D 53/0871* (2013.01); *B60D 1/14* (2013.01); *B60D 1/322* (2013.01); *B60D 1/62* (2013.01)

(58) Field of Classification Search
CPC .................................................. B62D 53/0871
See application file for complete search history.

(56) References Cited

U.S. PATENT DOCUMENTS

| | | | | |
|---|---|---|---|---|
| 3,420,548 A | * | 1/1969 | Wakeman | B62D 53/0878 280/455.1 |
| 3,749,420 A | * | 7/1973 | Johnson | B62D 53/0878 188/271 |
| 4,665,796 A | * | 5/1987 | Staisch | B62D 53/0871 251/266 |

FOREIGN PATENT DOCUMENTS

| | | | | |
|---|---|---|---|---|
| EP | 0514672 B1 | * | 11/1992 | |
| GB | 2365398 A | * | 2/2002 | B62D 53/0878 |

* cited by examiner

*Primary Examiner* — Kevin Hurley
*Assistant Examiner* — Hosam Shabara
(74) *Attorney, Agent, or Firm* — Fox Rothschild LLP

(57) ABSTRACT

A device for preventing jackknifing using a magnetic damping coupler of a tractor is provided. The device uses a magnetic damping coupler to prevent jackknifing due to a loss of stability in yawing of a trailer during driving.

15 Claims, 11 Drawing Sheets

[ A-A VIEW ]

[ B-B VIEW ]

DEVICE FOR PREVENTING JACKKNIFING USING MAGNETIC DAMPING COUPLER OF TRACTOR

CROSS REFERENCE TO RELATED APPLICATION

The present application claims priority to Korean Patent Application No. 10-2019-0168103, filed Dec. 16, 2019, the entire contents of which is incorporated herein for all purposes by this reference.

BACKGROUND

Field of the Disclosure

The present disclosure relates to a device for preventing jackknifing using a magnetic damping coupler of a tractor and, more particularly, to a device for preventing jackknifing of a tractor and a trailer that may occur when turning.

Description of the Related Art

In general, a tractor, which is a type of vehicle that is capable of pulling a trailer, has a coupler for connecting a trailer, and the trailer has a king pin that is fastened to the coupler. Referring to FIG. 1, a tractor 1 of the related art moves to a stopped trailer 2, aligns and fastens the center of a coupler 3 to the center of a king pin 4 of the trailer 2, and then fixes the king pin 4 to the coupler with a fixing pin to prevent the king pin 4 from separating from the center of the coupler 3.

When a king pin of a trailer is fastened to a coupler of a tractor, the king pin rotates vertically about the central coupling axis without moving horizontally and vertically, and is moved forward/backward by a pulling force of the tractor. The trailer that is unable to be steered when the tractor turns, rotates about the central coupling axis of the king pin and the coupler, and thus, the trailer is driven along the turning path of the tractor.

However, with such a mechanical coupling structure, when a trailer loses stability in yawing and the grip force of tires during high-speed traveling, the trailer rapidly turns about the central coupling axis and jackknifing occurs (see FIG. 2). When jackknifing in which the joint between a tractor and trailer bends occurs while the vehicle is being driven, in other words, when a tractor and a trailer are folded about a central coupling axis of a coupler and a king pin during operation, the risk of a vehicle accident increases.

SUMMARY

The present disclosure provides a device for preventing a tractor from jackknifing using a magnetic damping coupler, the device preventing jackknifing due to a loss of stability of yawing of a trailer during traveling.

The present disclosure provides a device for preventing jackknifing using a magnetic damping coupler of a tractor, the device may include: a coupler body disposed on a tractor and having a guide king pin of a trailer inserted therein; a cylinder disposed in the coupler body and filled with Magneto-Rheological (MR) fluid; a piston disposed in the cylinder to be able to be fastened to the guide king pin, having a flow aperture in which the MR fluid may flow, and having electromagnetic coils configured to generate magnetic fields in the flow aperture when a current is applied; and a controller configured to apply a current to at least one of the electromagnetic coils when determining that jackknifing of the tractor and the trailer has occurred.

According to the present disclosure, the cylinder may be formed in a semicircular shape that extends around the guide king pin inserted in an insertion aperture of the coupler body, the piston may have a coupling aperture in which a fastening pin of the guide king pin may be inserted, and when the trailer turns, the piston may rotate with the guide king pin about the guide king pin. The electromagnetic coils may be arranged in one line along the flow aperture of the piston.

The electromagnetic coils may include a first left coil disposed at a left side in the piston, a first right coil disposed at a right side in the piston, a second left coil disposed between the first left coil and the first right coil, and a second right coil disposed between the second left coil and the first right coil. A trailer steering angle sensor configured to detect a steering angle of the trailer due to rotation of the guide king pin may be disposed at the coupler body, and a tractor steering angle sensor configured to detect a steering angle of the tractor may be disposed at the tractor.

According to the present disclosure, when a turning direction according to a sign of the steering angle of the tractor and a turning direction according to a sign of the steering angle of the trailer are different, the controller may be configured to predict that jackknifing will occur, and apply a predetermined critical current only to one electromagnetic coil disposed in an opposite direction to the turning direction of the tractor of the electromagnetic coils.

When a turning direction according to a sign of the steering angle of the tractor and a turning direction according to a sign of the steering angle of the trailer are different and angular acceleration of the trailer is greater than angular acceleration of the tractor, the controller may be configured to determine that jackknifing has occurred, and apply a driving current to one or more of the electromagnetic coils. The controller may be configured to determine the number of electromagnetic coils to which a current is applied based on a difference between the angular acceleration of the tractor and the angular acceleration of the trailer. When a current is applied to two or more electromagnetic coils, the controller may be configured to sequentially apply a current from an electromagnetic coil disposed at the outermost side of electromagnetic coils disposed in an opposite direction to the turning direction of the tractor.

When a turning direction according to a sign of the steering angle of the tractor and a turning direction according to a sign of the steering angle of the trailer are different, angular acceleration of the trailer is greater than angular acceleration of the tractor, and wheels of the tractor are locked, the controller may be configured to determine that maximum jackknifing has occurred, and apply a current simultaneously to all of the electromagnetic coils disposed in the piston. In response to determining that there is no difference between the turning direction according to the sign of the steering angle of the tractor and the turning direction according to wheel speed information of the trailer, the controller may be configured to stop supplying a current to the electromagnetic coils.

According to the present disclosure, it may be possible to prevent jackknifing of a tractor and a trailer by adjusting operation of a magnetic damping coupler using MR fluid, and accordingly, it may be possible to secure stability during turning.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
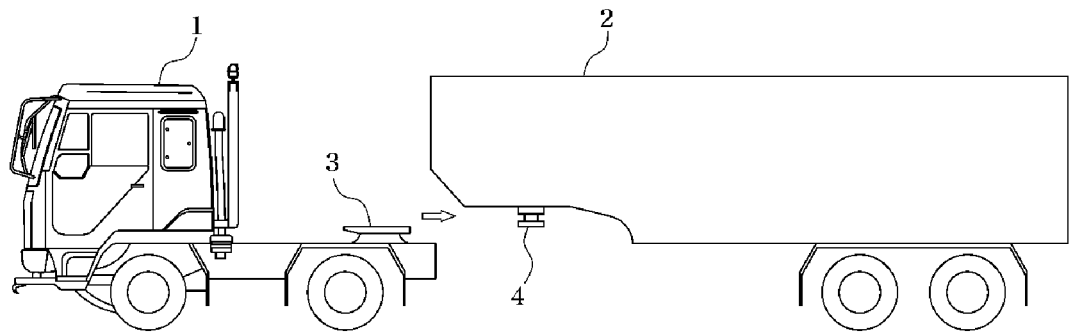
FIG. 1 is a view showing a coupler for connecting a tractor and a trailer in the related art.
Figure 2:
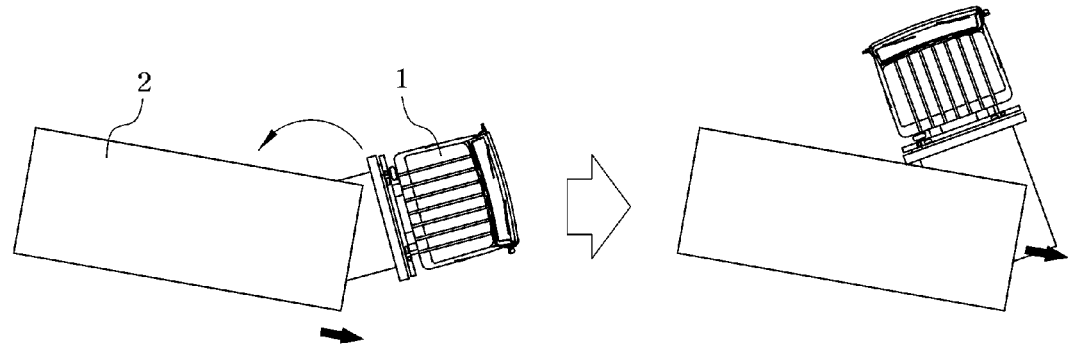
FIG. 2 is an exemplary view when a tractor and a trailer jackknife according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereafter, the present disclosure is described so that those skilled in the art may easily achieve the present disclosure.

Figure 6A:
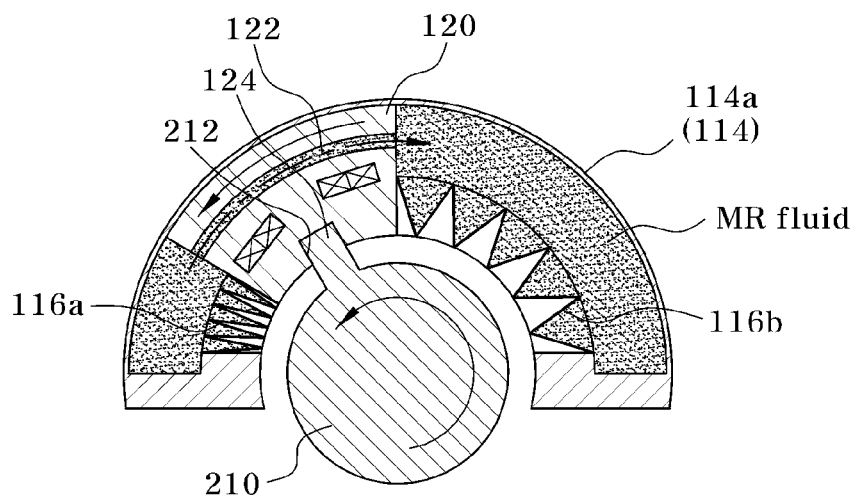
FIG. 6A is a view showing a state in which a piston according to the present disclosure has rotated left in a cylinder.
Figure 6B:
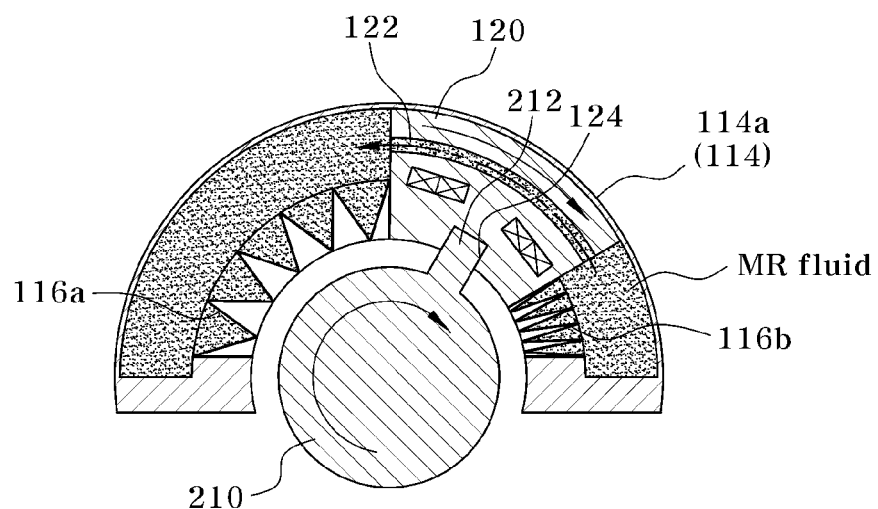
FIG. 6B is a view showing a state in which a piston according to the present disclosure has rotated right in the cylinder.
Figure 6C:
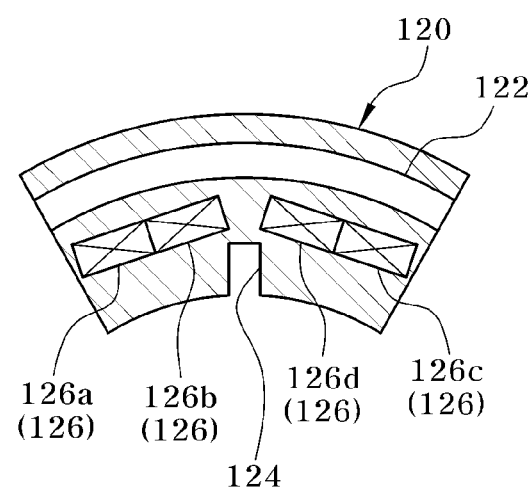
FIG. 6C is a view showing the internal structure of the piston according to an exemplary embodiment of the present disclosure.
Figure 7:
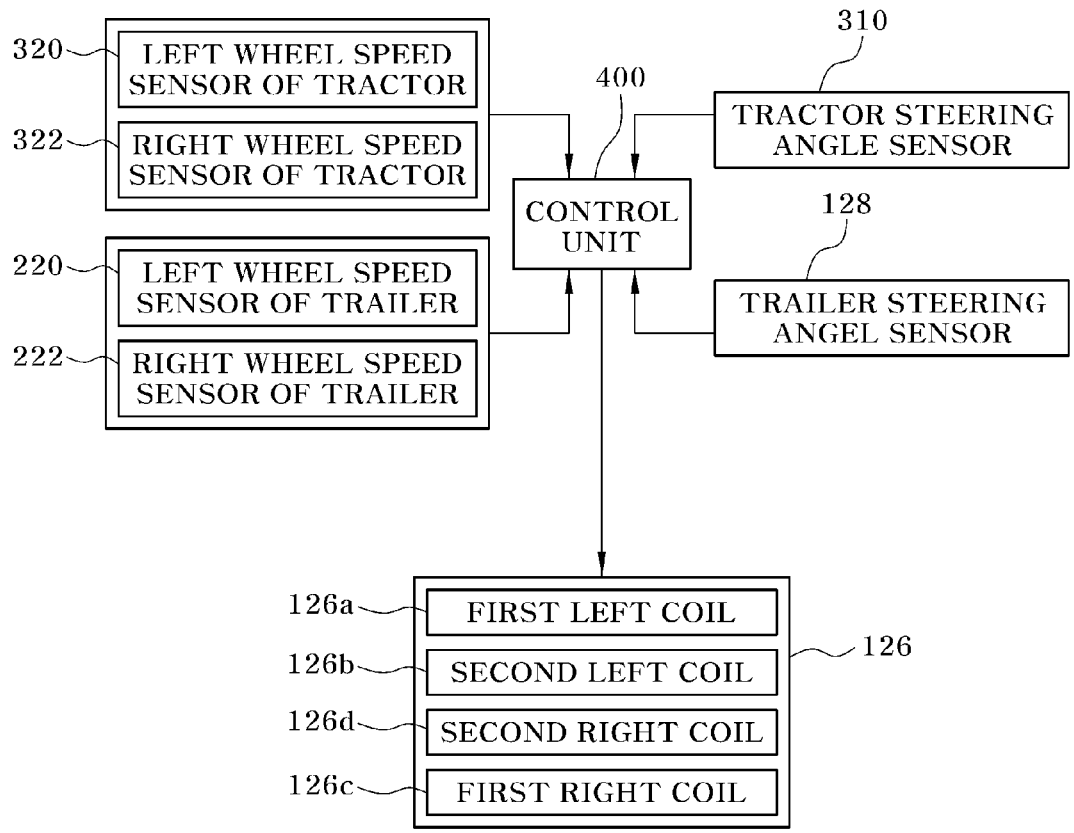
FIG. 7 is a view showing the configuration of a device for preventing jackknifing using a magnetic damping coupler according to an exemplary embodiment of the present disclosure.

FIGS. 3 to 5B show a magnetic damping coupler of a tractor and a guide king pin according to the present disclosure, in which reference numeral 100 indicates the magnetic damping coupler and reference numeral 210 indicates the guide king pin. FIGS. 6A and 6B show the operation states of a piston 120 and the guide king pin 210 and FIG. 6C shows the detailed structure of the piston 120. FIG. 7 shows a control device for preventing a tractor and a trailer from jackknifing by operating the magnetic damping coupler 100.

As shown in FIGS. 3 to 5A, the magnetic damping coupler 100 may include a coupler body 110 mounted on a tractor 10, a cylinder 114 disposed in the coupler body 110, a piston 120 disposed in the cylinder 120, and a trailer steering angle sensor 128 disposed on the coupler body 110. The coupler body 110 may be disposed in a trailer mount 14 of the tractor 10 and may include an insertion aperture 112 in which the guide king pin 210 of the trailer 20 may be inserted. The trailer mount 14 may be disposed behind the tractor cap 12 having the cockpit of the tractor 10.

The cylinder 114 may be disposed at the center portion of the top of the coupler body 110 and may be formed in a semicircular shape disposed around the guide king pin 210 inserted in the insertion aperture 112. The piston may be disposed in the internal space of the cylinder 114 and the internal space is filled with Magneto-Rheological (MR) fluid. The piston 120 may include a flow aperture in which the MR fluid may flow and a coupling aperture 124 in which a fastening pin 212 of the guide king pin 210 may be inserted. The flow aperture 122 may be formed in an arc shape that extends around the cylinder 114 and the coupling aperture 124 may be formed in a straight shape (e.g., linear) on the inner side of the piston 120 which faces the guide king pin 210.

The fastening pin 212 of the guide king pin 210 may be inserted in the coupling aperture 124, and thus, when the trailer 20 turns, the piston 120 may rotate with the guide king pin 210 about the guide king pin 210. The piston 120 may divide the internal space of the cylinder 114 into two sections when disposed at the center of the cylinder 114. Accordingly, the MR fluid in the cylinder 114 may move to the left and right of the piston 120 only through the flow aperture 122 of the piston 120. In other words, the internal space of the cylinder 114 may be divided into two sections by the piston 120.

Further, the piston 120 may include electromagnetic coils 126 therein, which are disposed adjacent to the flow aperture 122. The electromagnetic coils 126 may be configured to generate magnetic fields when a current is applied, and the magnetic fields influence the position of the flow aperture 122 adjacent to the electromagnetic coils 126. As shown in FIG. 6C, the electromagnetic coils 126 may be arranged in a line (e.g., linearly) along the flow aperture 122 of the piston 120. In other words, the electromagnetic coils 126 may be arranged in the longitudinal direction of the flow aperture 122.

In particular, the electromagnetic coils 126 may include a first left coil 126a disposed at the left side in the piston 120, a first right coil 126c disposed at the right side in the piston 120, a second left coil 126b disposed between the first left coil 126a and the first right coil 126c, and a second right coil 126d disposed between the second left coil 126b and the first right coil 126c. The first left coil 126a and the second left coil 126b may be disposed adjacent to each other, and the first right coil 126c and the second right coil 126d may be disposed adjacent to each other. Further, the second left coil 126b and the second right coil 126d may be spaced apart from each other with a predetermined gap formed therebetween.

The electromagnetic coils 126 may be configured to generate magnetic fields that relatively greatly influence areas of the flow aperture 122, which are adjacent to the electromagnetic coils, of positions in the longitudinal direction of the flow aperture 122. When a current is applied only to the first left coil 126a, a substantial magnetic field may be generated at a position of the flow aperture 122 (i.e., a first position) that is on the same radial line as the first left coil 126a of four divided positions of the flow aperture 122.

When a current is applied only to the second left coil 126b, a substantial magnetic field may be generated at a position of the flow aperture 122 (i.e., a second position) that is on the same radial line as the second left coil 126b of the four divided positions of the flow aperture 122. When a current is applied only to the second right coil 126d, a substantial magnetic field may be generated at a position of the flow aperture 122 (i.e., a third position) that is on the same radial line as the second right coil 126d of the four divided positions of the flow aperture 122. When a current is applied only to the first right coil 126c, a substantial magnetic field may be generated at a position of the flow aperture 122 (i.e., a fourth position) that is on the same radial line as the first right coil 126c of the four divided positions of the flow aperture 122.

Figure 4A:
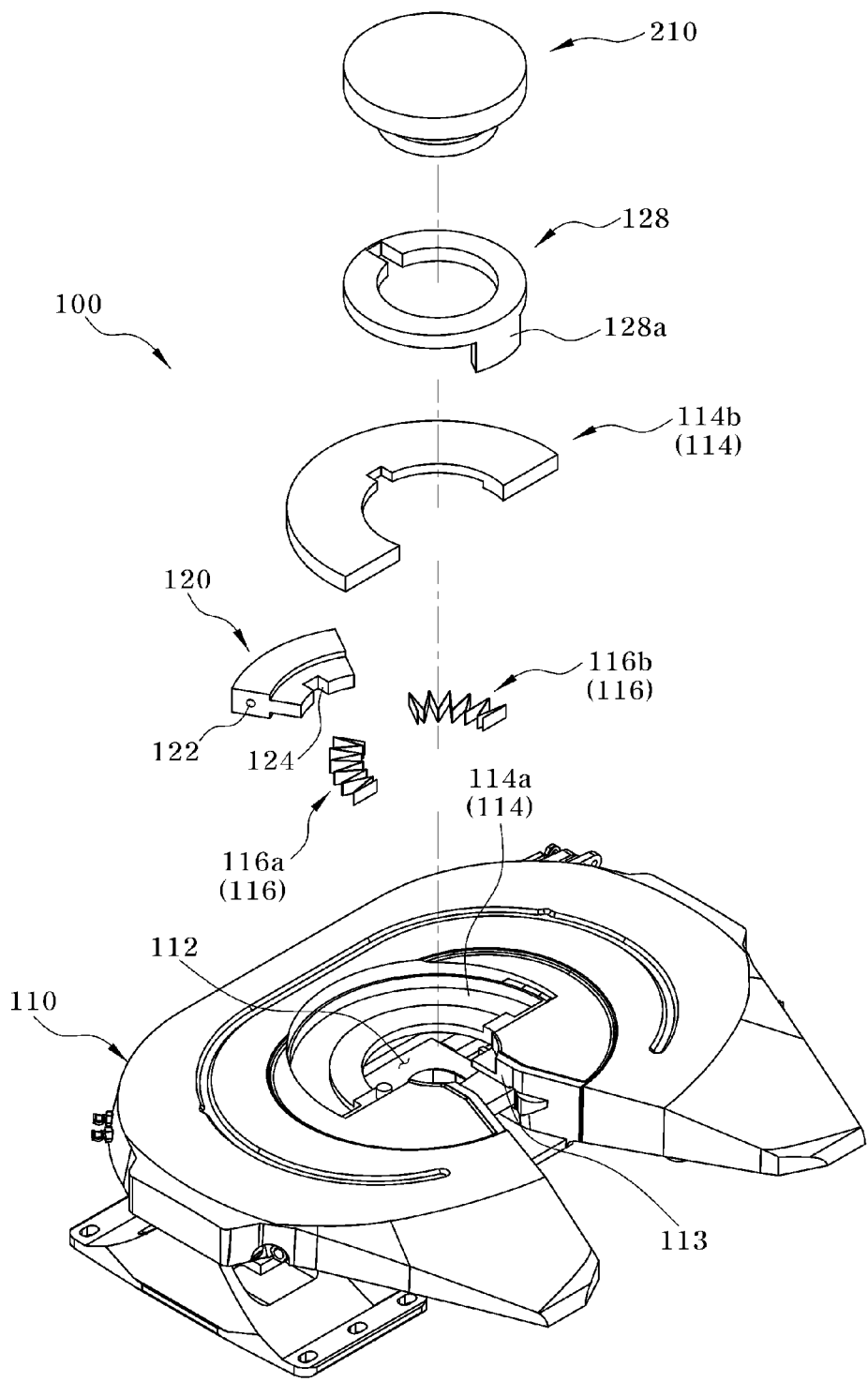
FIG. 4A is an exploded perspective view showing a magnetic damping coupler and a guide king pin according to an exemplary embodiment of the present disclosure.
Figure 4B:
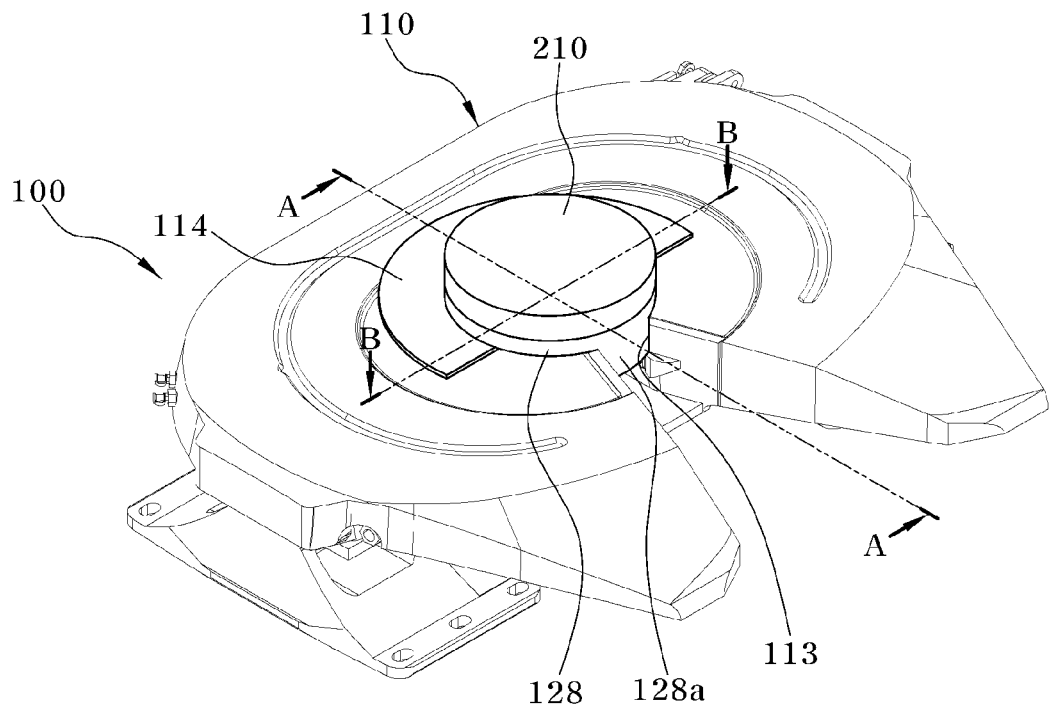
FIG. 4B is a perspective view showing an assembly of the magnetic damping coupler and the guide king pin according to an exemplary embodiment of the present disclosure.
Figure 5A:
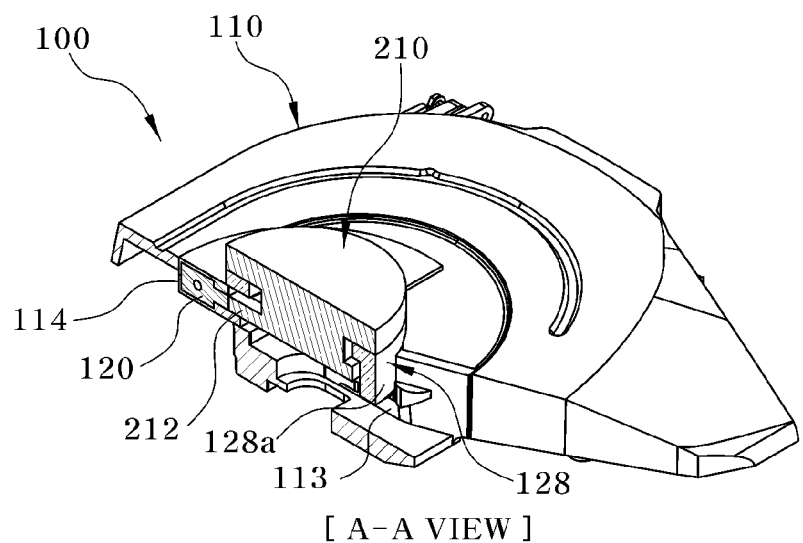
FIG. 5A is a cross-sectional view taken along line A-A shown in FIG. 4B according to an exemplary embodiment of the present disclosure.
Figure 5B:
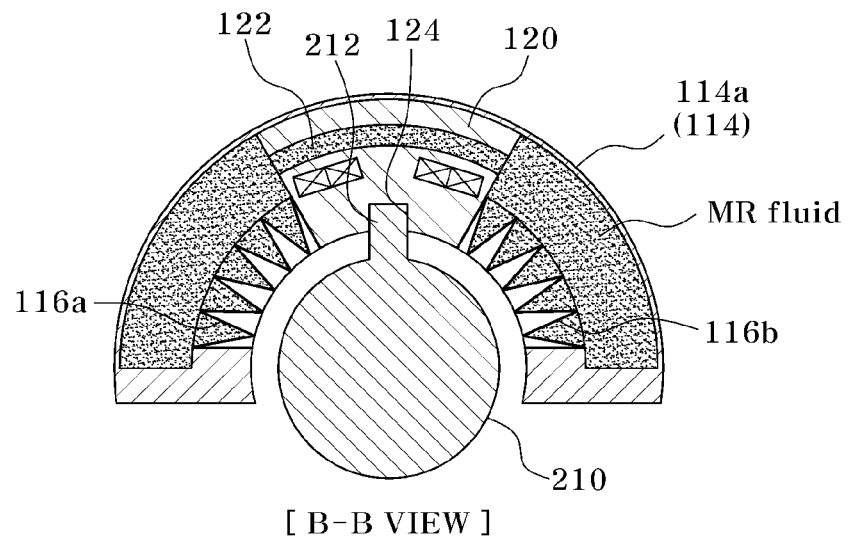
FIG. 5B is a cross-sectional view showing the assembly of the magnetic damping coupler and the guide king pin according to an exemplary embodiment of the present disclosure.

Further, as shown in FIGS. 4A and 5B, a foldable sealing member 116 made of a flexible material may be disposed on the inner circumferential surface of the cylinder 114 to allow the piston 120 to rotate in the cylinder 114 when connected to the king pin 210. The sealing member 116 may include a first sealing member 116a and a second sealing member 116b disposed at both sides of the piston 120. Both ends of the first sealing member 116a may be attached and fixed to the left inner wall of the cylinder 114 and the left side of the piston 120, respectively. Both ends of the second sealing member 116b may be attached and fixed to the right inner wall of the cylinder 114 and the right side of the piston 120, respectively. The first sealing member 116a and the second sealing member 116b may fold or spread when the piston 120 moves.

As shown in FIG. 6A, when the piston 120 moves left in the cylinder 114, the first sealing member 116a may fold and the second sealing member 116b may spread. Further, as shown in FIG. 6B, when the piston 120 moves right in the cylinder 114, the first sealing member 116a may spread and the second sealing member 116b may fold. When folding or spreading, the first sealing member 116a and the second sealing member 116b maintain in close contact (e.g., abutting contact) with the upper and lower inner walls of the cylinder 114, thereby preventing the MR fluid in the cylinder 114 from leaking when the piston 120 rotates in the cylinder 114.

Additionally, the cylinder 114 may include a bottom plate 114a to which the piston 120 may be coupled and a top plate 114b that covers the open upper end of the bottom plate 114a. The trailer steering angle sensor 128 may be configured to detect the steering angle of the trailer 20 when the guide king pin 210 rotates. The trailer steering angle sensor 128 may be coupled and fixed to the coupler body 110 and may be positioned around the guide king pin 210 inserted in the insertion aperture 112 of the coupler body 110. The trailer steering angle sensor 128 may include a fixing portion 128a at the lower end. The fixing portion 128a may be fitted in an opening 113 of the coupler body 110, to prevent the fixing portion 128a from rotating when the guide king pin 1210 rotates.

Figure 3:
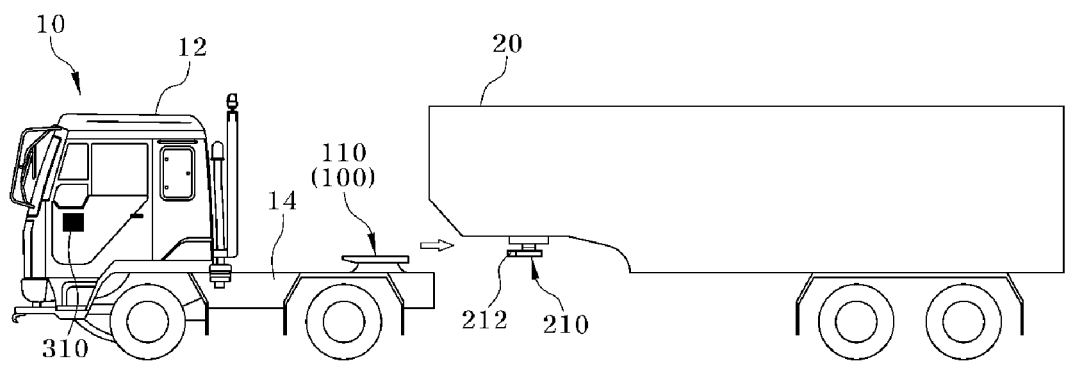
FIG. 3 is a view showing a magnetic damping coupler of a tractor and a guide king pin of a trailer according to an exemplary embodiment of the present disclosure.

Further, as shown in FIG. 3, a tractor steering angle sensor 310 configured to detect the steering angle of the tractor 10 may be disposed at the tractor cap 12 of the tractor 10. The tractor steering angle sensor 310, similar to common automotive steering angle sensors, may be configured to detect the steering angle of driving wheels by rotation of a steering wheel.

Trailer steering angle information detected by the trailer steering angle sensor 128 and the tractor steering angle information detected by the tractor steering angle sensor 310, as shown in FIG. 7, may be transmitted to a controller 400 configured to adjust currents that are applied to the electromagnetic coils 126. In response to determining that the tractor 10 and the trailer 20 have jackknifed, the controller 400 may be configured to adjust distribution and density of the magnetic powders of the MR fluid arranged in the flow aperture 122 of the piston 120 by applying a current to at least one of the electromagnetic coils 126.

The MR fluid is fluid in which colloid-shaped magnetic powders are dispersed, and the arrangement and distribution of the magnetic powders in the liquid may be changed and adjusted by a magnetic field. Accordingly, when a current is applied to the electromagnetic coils 126 by the controller 400, the distribution and density of the magnetic powders arranged in the flow aperture 122 of the piston 120 may be adjusted. Further, it may be possible to increase the density of magnetic powders arranged at a predetermined position in the flow aperture 122 by applying a current only to a predetermined coil of four electromagnetic coils 126 by the controller 400.

As the distribution and density of the magnetic powders arranged in the flow aperture 122 are adjusted, flow resistance of the MR fluid passing through the flow aperture 122 when the tractor 10 turns may be changed, whereby it may be possible to adjust flow of the MR fluid in the cylinder 114. When the tractor 10 turns at a high speed, the flow resistance of the MR fluid increases and yawing energy of the tractor is attenuated, thereby preventing a jackknifing phenomenon (i.e., jackknifing) in which the tractor 10 and the trailer 20 are bent with the guide king pin 210 therebetween.

In general, when jackknifing does not occur, the trailer turns left and right about the guide king pin 210 and moves along the turning path of the tractor 10. Accordingly, when jackknifing does not occur, the trailer 20 turns in the same direction as the tractor 10. When jackknifing occurs, the turning direction of the tractor 10 and the turning direction of the trailer 20 become different, and the turning directions may be determined in accordance with steering angle information detected by steering angle sensors. For example, right turning may be determined when the sign of the steering angle of the tractor 10 is (+), and left turning may be determined when the sign of the steering angle of the tractor 10 is (−).

Accordingly, when the tractor 10 is driven at a high speed over a predetermined reference speed (e.g., about 80 kph) and when the sign of the steering angle of the tractor 10 and the sign of the steering angle of the trailer 20 become different, the controller 400 may be configured to determine that tractor-following stability of the trailer 20 is insufficient, and predict that jackknifing will occur. In other words, the controller 400 may be configured to determine the point in time when the turning direction according to the sign of the steering angle of the tractor 10 and the turning direction according to the sign of the steering angle of the trailer 20 become different, as the point in time at which jackknifing is expected or predicted.

When the turning direction of the tractor 10 and the turning direction of the trailer 20 are the same, the controller 400 may be configured to determine that jackknifing does not occur. When the direction of the tractor 10 and the turning direction of the trailer 20 are different, the controller 400 may be configured to apply a critical current only to one electromagnetic coil disposed in the opposite direction to the turning direction of the tractor 10 of the electromagnetic coils 126. The critical current may be set as a current that less than a driving current that is applied to the electromagnetic coils in response to determining that jackknifing has occurred.

For example, when the turning direction of the tractor 10 is right, a critical current may be applied only to the first left coil 126a at the leftmost side, and when the turning direction of the tractor 10 is left, a critical current may be applied only to the first right coil 126c at the rightmost side. When jackknifing is expected and a critical current is applied only to the first left coil 126a or the first right coil 126c, a control response speed of the MR fluid may be increased.

When the turning directions of the tractor 10 and the trailer 20 are different and the angular acceleration of the trailer 20 is greater than the angular acceleration of the tractor 10, the controller 400 may be configured to determine that jackknifing has occurred, and apply a current to one or more of the electromagnetic coils 126. The angular acceleration is a value showing a change in steering angle per unit time. When the angular acceleration of the trailer 20 is greater than the angular acceleration of the tractor 10, the trailer 20 following the tractor 10 turns faster than the tractor 10, and thus, the controller 400 may be configured to determine that the tractor-following stability of the trailer 20 is lost and jackknifing has occurred.

In particular, the controller 400 may be configured to the number of electromagnetic coils to which a current is applied, based on the difference between the angular acceleration of the tractor 10 and the angular acceleration of the trailer 20. The controller 400 may be configured to perform step control that sequentially applies a current from the electromagnetic coil disposed in the opposite direction to the turning direction of the tractor 10. In particular, when a driving current is applied two or more electromagnetic coils, the controller 400 may be configured to sequentially apply a current from the electromagnetic coil at the outermost side of the electromagnetic coils disposed in the opposite direction to the turning direction of the tractor 10.

For example, when the tractor 10 turns left and the difference between the angular accelerations of the tractor 10 and the trailer 20 exceeds 0% and is about 10% or less of the angular acceleration of the tractor, a driving current may be applied only to the first right coil 126c. When the tractor 10 turns left and the difference between the angular accelerations of the tractor 10 and the trailer 20 exceeds about 10% and is about 20% or less of the angular acceleration of the tractor, a driving current may be sequentially applied to the first right coil 126c and the second right coil 126d.

When the tractor 10 turns left and the difference between the angular accelerations of the tractor 10 and the trailer 20 exceeds about 20% and is about 40% or less of the angular acceleration of the tractor, a driving current may be sequentially applied to the first right coil 126c, the second right coil 126d, and the second left coil 126b. When the difference between the angular accelerations of the tractor 10 and the trailer 20 exceeds about 40% of the angular acceleration of the tractor, a driving current may be applied to the four electromagnetic coils 126 regardless of the turning direction of the tractor 10. However, when the tractor 10 turns right, a driving current may be sequentially applied from the first left coil 126a, and when the tractor 10 turns left, a driving current may be sequentially applied from the first right coil 126c.

For example, when the tractor 10 is turning left, a current may be applied first to the first right coil 126c, and then sequentially applied to the second right coil 126d, the second left coil 126b, and the first left coil 126a. When the tractor 10 is turning right, a current may be applied first to the first left coil 126a, and then sequentially applied to the second left coil 126b, the second right coil 126d, and the first right coil 126c.

Additionally, when the turning directions of the tractor 10 and the trailer 20 are different, the angular accelerations of the tractor 10 and the trailer 20 are different, and wheels are locked by braking the tractor, the controller 400 may be configured to determine that maximum jackknifing capable of occurring between the tractor 10 and the trailer 200 has occurred. When maximum jackknifing occurs, the controller 400 may be configured to determine an emergency situation in which the tractor 10 and the trailer 20 have been maximally folded within an allowable range, and in response thereto, apply a driving current simultaneously to the four electromagnetic coils 126.

In general, when wheels are locked, the speed of the wheels of the tractor 10 rapidly decreases down to almost zero (0) while the tractor 10 is driven. Accordingly, the controller 400 may be configured to determine whether wheels have locked, based on real-time wheel speed information and real-time vehicle speed information of the tractor 10. The controller 400 may be configured to receive and monitor wheel speed information from wheel speed sensors 320 and 322 respectively mounted on the left and right wheels of the tractor 10.

Figure 8A:
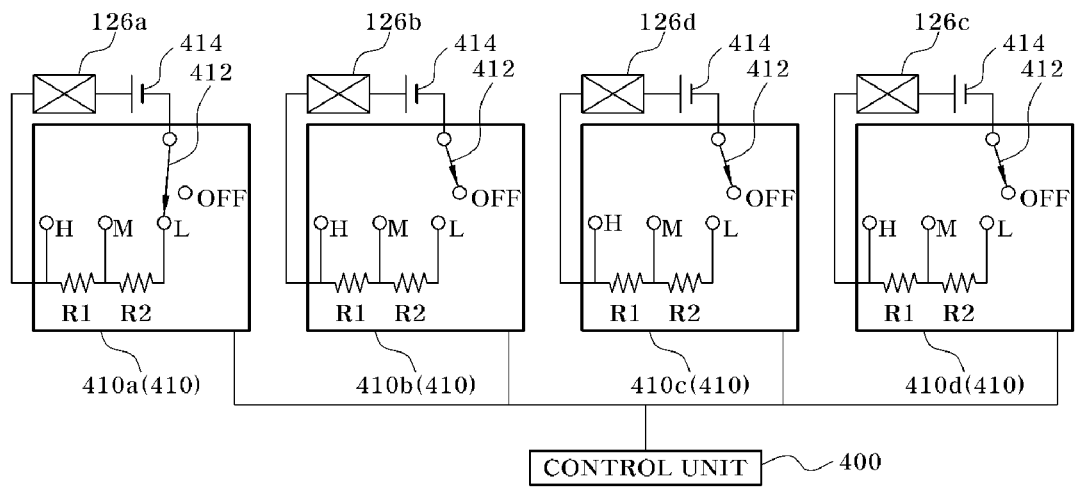
FIG. 8A is a view showing operation states of a current controller when a magnetic damping coupler is operated in a damping-ready mode according to an exemplary embodiment of the present disclosure.
Figure 8B:
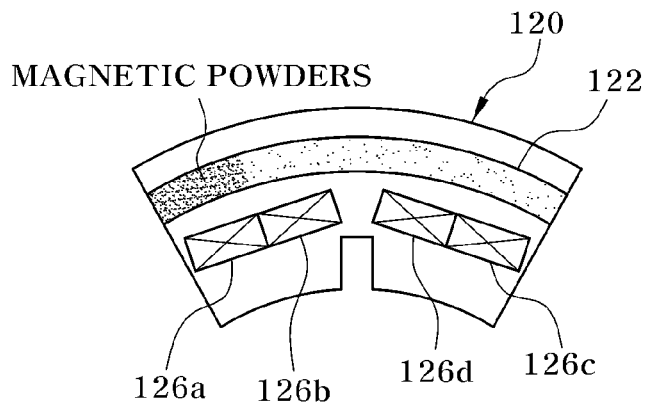
FIG. 8B is a view showing distribution of magnetic powders in a flow aperture according to the operation of an electromagnetic coil when the magnetic damping coupler is operated in the damping-ready mode according to an exemplary embodiment of the present disclosure.
Figure 8C:
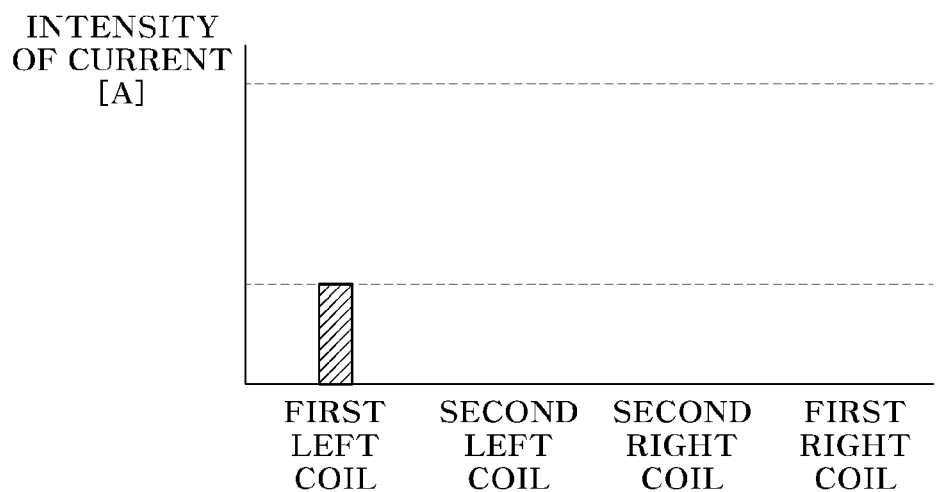
FIG. 8C is a view showing the intensity of a current that is applied to the electromagnetic coil when the magnetic damping coupler is operated in the damping-ready mode according to an exemplary embodiment of the present disclosure.

The current control method of the electromagnetic coils 126 that is performed when jackknifing is expected or predicted is further described with reference to FIGS. 8A to 8C. FIG. 8A shows an operation state (e.g., first operation state) of a current controller configured to adjust the current that is applied to the electromagnetic coils when the magnetic damping coupler 100 is operated in a damping-ready mode, FIG. 8B shows distribution of the magnetic powders in the flow aperture according to operation of the electromagnetic coils, and FIG. 8C shows the intensity of currents that are applied to the electromagnetic coils.

As shown in FIG. 8A, the current controller 410 may include a first current controller 410a configured to adjust a current that is applied to the first left coil 126a, a second current controller 410b configured to adjust a current that is applied to the second left coil 126b, a third current controller 410c configured to adjust a current that is applied to the second right coil 126d, and a fourth current controller 410d configured to adjust a current that is applied to the first right coil 126c. Accordingly, it may be possible to separately operate the coils 126a, 126b, 126c, and 126d using the current controller 410.

When the signs of the steering angles of the tractor 10 and the trailer 20 start to be different, the controller 400 may be configured to operate the magnetic damping coupler 100 into a damping-ready mode. The controller 400 may be configured to monitor in real time the turning directions of the tractor 10 and the trailer 20 based on information from the tractor steering angle sensor 310 and the trailer steering angle sensor 128 while the vehicle is being driven.

When the turning directions of the tractor 10 and the trailer 20 become different, that is, when the signs of the steering angles of the tractor 10 and the trailer 20 start to be different, the controller 400 may be configured to apply a critical current (e.g., a small current) to the outermost electromagnetic coil disposed in the opposite direction to the turning direction of the tractor 10. The controller 400 may be configured to apply a critical current only to the first left coil 126a by operating the first current controller 410a when the tractor 10 turns right, and apply a critical current only to the first right coil 126c through the fourth current controller 410d when the tractor 10 turns left. When a critical current is applied only to the first left coil 126a, as shown in FIG. 8B, the magnetic powders may be arranged in the left area of the flow aperture 122 that is positioned on the same radial line as the first left coil 126a, and thus, the density of the magnetic powder in the left area of the flow aperture 122 increases relative to that of the other area of the flow aperture 122.

Additionally, when a critical current is applied only to the first left coil 126a, as shown in FIG. 8C, a current is not applied only to the second left coil 126b, the second right coil 126d, and the first right coil 126c. Referring to FIG. 8A, the current controller 410 may be configured to adjust the currents that are applied to a first resistor R1 and a second resister R2 that are connected to the electromagnetic coils 126 in series to adjust the intensity of the currents that are applied to the electromagnetic coils 126.

The current controller 410 may be configured to apply a current only to the first resistor R1 or to the first resistor R1 and the second resistor R2 by adjusting flow of a current using a switch 412, to thus adjust the intensity of the resistors connected to the electromagnetic coils 126. Accordingly, it may be possible to adjust the intensity of the magnetic field generated in the flow aperture 122. When the magnetic damping coupler 100 is operated into the damping-read mode, the first current controller 410a or the fourth current controller 410d may be configured to operate the switch 412 such that a current is applied to the first resistor R1 and the second resistor R2, and the second current controller 410b and the third current controller 410c may connect the switch 412 to an off-terminal to prevent a current from being applied to the second left coil 126b and the second right coil 126d.

A weak magnetic field may be generated in the flow aperture 122 by applying a critical current to the first left coil 126a or the first right coil 126c before jackknifing is suppressed by operating the magnetic damping coupler 100 into a damping-normal mode, whereby it may be possible to increase an arrangement response speed of the magnetic powders in the MR fluid when applying a driving current to predetermined electromagnetic coils. Since the response speed of the magnetic powders increases, it may be possible to prevent a driver from feeing uncomfortable due to operating the magnetic damping coupler 100 into the damping-normal mode during driving.

Figure 9A:
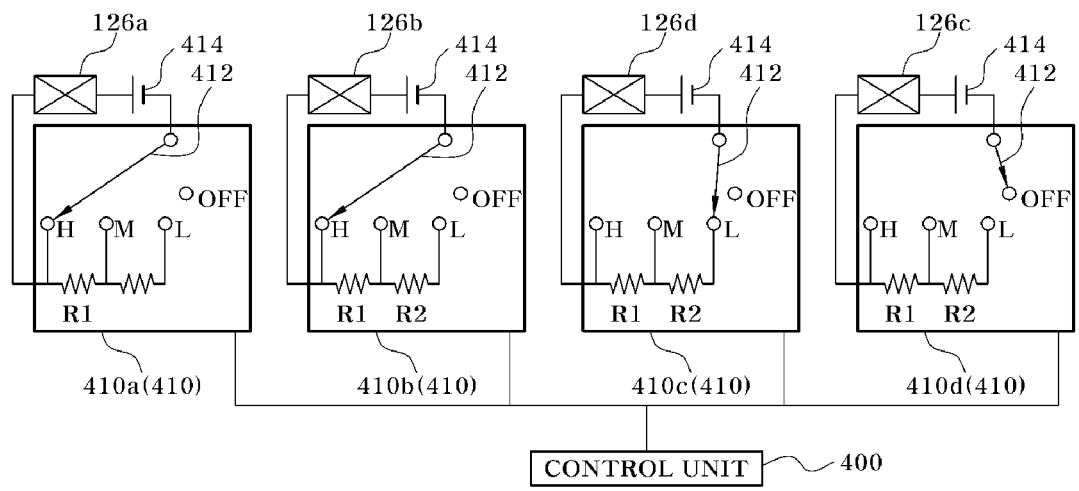
FIG. 9A is a view showing operation states of the current controller when a magnetic damping coupler is operated in a damping-normal mode according to an exemplary embodiment of the present disclosure.
Figure 9B:
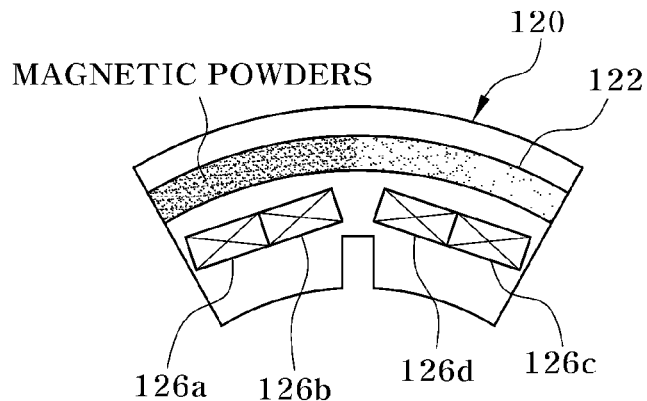
FIG. 9B is a view showing distribution of magnetic powders in the flow aperture according to the operation of the electromagnetic coil when the magnetic damping coupler is operated in the damping-normal mode according to an exemplary embodiment of the present disclosure.
Figure 9C:
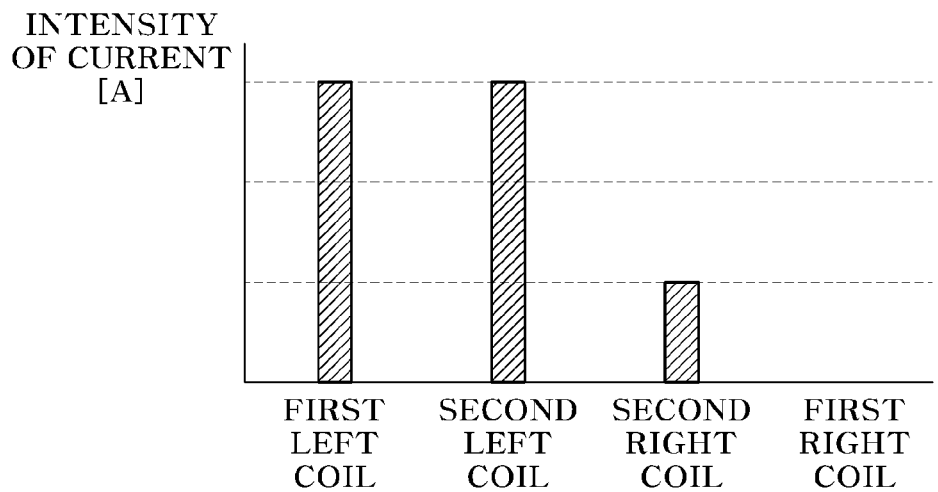
FIG. 9C is a view showing the intensity of a current that is applied to the electromagnetic coil when the magnetic damping coupler is operated in the damping-normal mode according to an exemplary embodiment of the present disclosure.

Furthermore, the current control method of the electromagnetic coils 126 that is performed to prevent jackknifing is further described with reference to FIGS. 9A to 9C. FIG. 9A shows an operation state (e.g., second operation state) of the current controller 410 when the magnetic damping coupler 100 is operated in the damping-normal mode, FIG. 9B shows distribution of the magnetic powders in the flow aperture according to operation of the electromagnetic coils, and FIG. 9C shows the intensity of currents that are applied to the electromagnetic coils.

After the magnetic damping coupler 100 enters the damping-ready mode, when the angular acceleration of the tractor 10 becomes greater than the angular acceleration of the trailer 20, the magnetic damping coupler 100 may enter the damping-normal mode and a driving current may be applied to the electromagnetic coil disposed in the opposite direction to the turning direction of the tractor 10 to decrease the difference between the angular accelerations of the tractor 10 and the trailer 20.

The driving current may be applied to the electromagnetic coils 126 by the current controller 410 and the operation of the current controller 410 may be executed by the controller 400. In the damping-normal mode, the degree of danger of jackknifing due to the difference between the angular accelerations of the tractor 10 and the trailer 20 and the number of electromagnetic coils to which a driving current is applied in accordance with the difference between the angular accelerations may be determined.

When a driving current is applied to only one electromagnetic coil, the driving current may be applied to the outermost electromagnetic coil (e.g., the first left coil or the first right coil) disposed in the opposite direction to the turning direction of the tractor 10.

When a driving current is applied to two or more electromagnetic coils, two or more electromagnetic coils may be sequentially determined from the outermost electromagnetic coil disposed in the opposite direction to the turning direction of the tractor 10.

Further, when a driving current is applied to two or more electromagnetic coils, a driving current may be sequentially applied from the outermost electromagnetic coil disposed in the opposite direction to the turning direction of the tractor 10. For example, when a driving current is applied to three electromagnetic coils in accordance with the difference between the angular accelerations of the tractor 10 and the trailer 20 and when the tractor 10 is turning right, the driving current may be sequentially applied to the first left coil 126a, the second left coil 126b, and the second right coil 126d.

In particular, as shown in FIG. 9C, a predetermined first driving current (e.g., maximum driving current) may be applied to the first left coil 126a and the second left coil 126b, and a second driving current (e.g., minimum driving current) that is less in intensity than the first driving current may be applied to the second right coil 126d. As shown in FIG. 9B, the magnetic powders may be arranged in the area of the flow aperture 122 positioned on the same radial line as the first left coil 126a, the second left coil 126b, and the second right coil 126d. In particular, the magnetic powders are more intensively arranged (e.g., arranged in a closer configuration or in abutting surface contact) in the left area of the flow aperture 122 positioned on the same line as the first left coil 126a and the second left coil 126b, while, in the right area of the flow aperture 122 positioned in the same line as the second right coil 126d, the density of the magnetic powder increases, but the magnetic powders are relatively less intensively arranged than the left area of the flow aperture 122. Further, when a driving current is applied to two or more electromagnetic coils, a driving current finishes being applied to one electromagnetic coil and then a driving current may be applied to the next electromagnetic coil.

Referring to FIG. 9A, the current controller 410 may be configured to adjust the intensity of the resistor through separate three steps when applying a current to the electromagnetic coils 126. In particular, the current controller 410 does not apply a current to the first resistor R1 and the second resistor R2, or applies a current only to the first resistor R1, or applies a current to both the first resistor R1 and the second resistor R2. The current controller 410 may be configured to determine whether to apply a current to the first resistor R1 and the second resistor R2 by operating the switch 412 to thus adjust the intensity of the magnetic fields of the electromagnetic coils 126.

On the other hand, the controller 400 may be configured to compete the adjustment of the current for the electromagnetic coils 126 when the difference between the turning radius of the tractor 10 and the turning radius of the trailer 20 becomes 0 (zero). In other words, the controller 400 may be configured to finish supplying the current to the electromagnetic coils 126 when the difference between the turning radius of the tractor 10 and the turning radius of the trailer 20 is removed.

The turning radius of the tractor 10 may be calculated based on the steering angle information of the tractor 10 and the turning radius of the trailer 20 may be calculated from the wheel speed information of the trailer 20. The turning direction and the turning radius of the trailer 20 may be calculated based on the difference between left wheel speed information and right wheel speed information of the trailer 20.

It may be possible to more accurately calculate the turning radius of the trailer 20 by using the wheel speed information of the trailer 20 rather than the steering angle information of the trailer 20. The controller 400 may be configured to obtain the wheel speed information of the trailer from a left wheel speed sensor 220 configured to detect left wheel speed information of the trailer and a right wheel speed sensor 222 configured to detect right wheel speed information. The current control method of the electromagnetic coils 126 that is performed to prevent maximum jackknifing is further described with reference to FIGS. 10A to 10C.

Figure 10A:
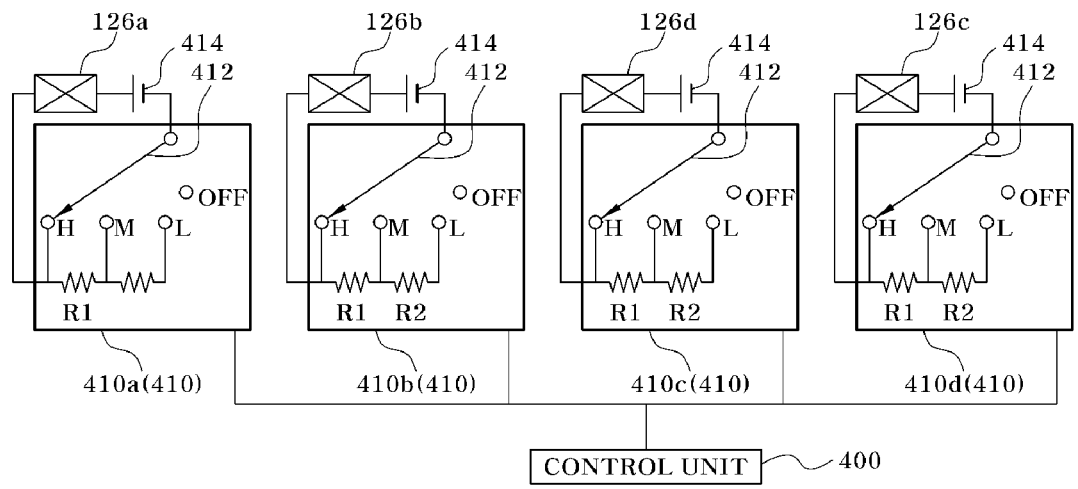
FIG. 10A is a view showing operation states of the current controller when a magnetic damping coupler is operated in a damping-emergency mode according to an exemplary embodiment of the present disclosure.
Figure 10B:
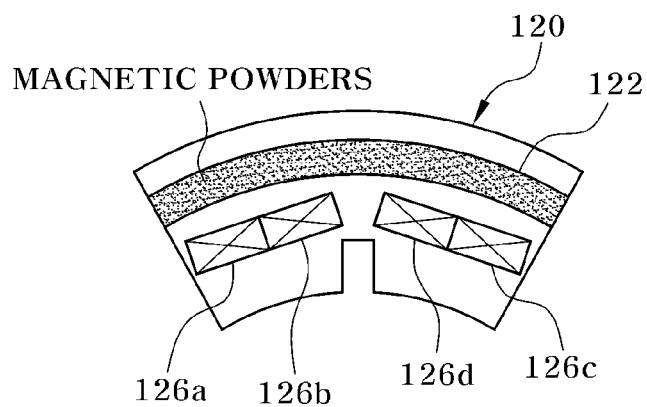
FIG. 10B is a view showing distribution of magnetic powders in the flow aperture according to the operation of the electromagnetic coil when the magnetic damping coupler is operated in the damping-emergency mode according to an exemplary embodiment of the present disclosure.
Figure 10C:
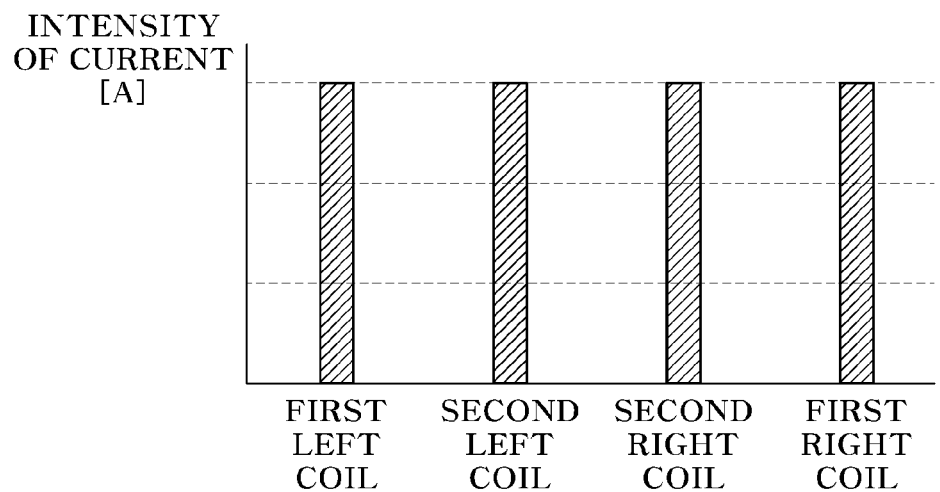
FIG. 10C is a view showing the intensity of a current that is applied to the electromagnetic coil when the magnetic damping coupler is operated in the damping-emergency mode according to an exemplary embodiment of the present disclosure.

FIG. 10A shows an operation state (e.g., third operation state) of the current controller 410 when the magnetic damping coupler 100 is operated in a damping-emergency mode, FIG. 10B shows distribution of the magnetic powders in the flow aperture according to operation of the electromagnetic coils, and FIG. 10C shows the intensity of currents that are applied to the electromagnetic coils.

When wheels are locked by rapid braking of the tractor 10 that is turning at a high speed, the controller 400 may be configured to determine an emergency situation with high possibility of jackknifing, and may be configured to operate the magnetic damping coupler 100 into a damping-emergency mode. Wheel-locking that occurs when the tractor 10 turns causes maximally possible dangerous jackknifing. In particular, the controller 400 may be configured to apply a driving current to the four electromagnetic coils through the current controller 410. A driving current with predetermined maximum intensity may be applied to all of the four electromagnetic coils 126.

When the maximum driving current is applied to of the four electromagnetic coils 126, the magnetic powders of the MR fluid are intensively arranged in the entire flow aperture 122 of the piston 120, and accordingly, the MR liquid is unable to pass through the flow aperture 122. Since the flow aperture 122 prevents the MR fluid from flowing, yawing of the tractor may be suppressed, and as a result, jackknifing of the tractor and the trailer may be prevented.

The controller 400 may be configured to monitor the wheel speed of the tractor 10 while a driving current is applied to the electromagnetic coils 126. In response to determining that wheel-locking of the tractor 10 is removed based on the wheel speed information, the controller 400 may be configured to compare the turning radius of the tractor 10 and the turning radius of the trailer 20. In response to determining that there is no difference between the turning radius of the tractor 10 and the turning radius of the trailer 20, the controller 400 may be configured to stop supplying a current to the electromagnetic coils 126.

In particular, the difference between the angular accelerations of the tractor 10 and the trailer 20 and the difference between the turning radii of the tractor 10 and the trailer 20 decrease, so it may be possible to determine tractor-following stability of the trailer 20. Further, it may be possible to reduce step by step the number of electromagnetic coils 126 to which the current is applied and the intensity of the current that is applied to the electromagnetic coils 126 in accordance with the tractor-following stability of the trailer 20. Additionally, reference numeral '414' in FIGS. 8A, 9A, and 10A indicates a power source that supplies the current to be applied to the electromagnetic coils 126.

Figure 11A:
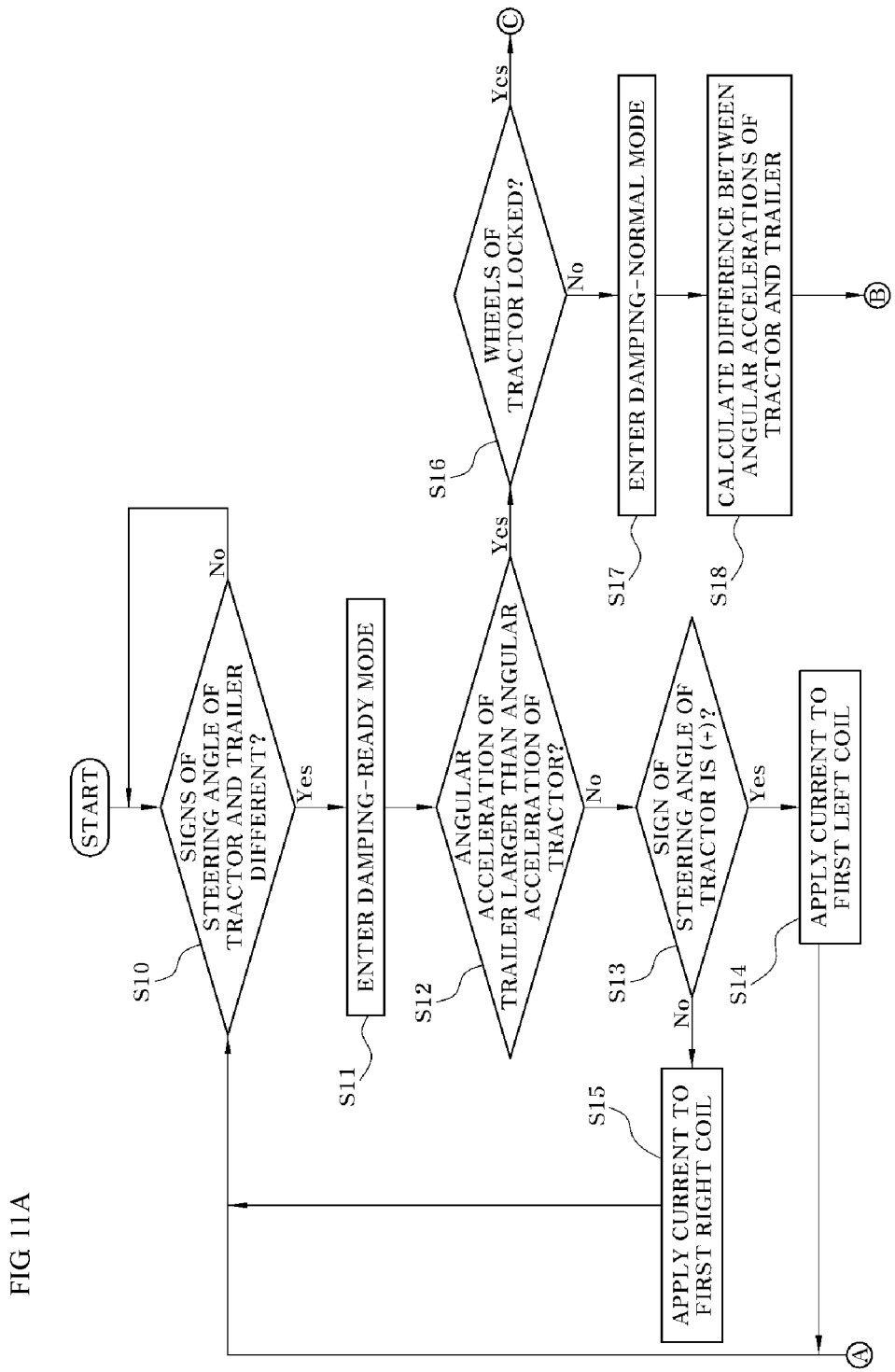
FIGS. 11A and 11B are flowcharts showing a control process for preventing jackknifing according to an exemplary embodiment of the present disclosure.

Hereafter, a control process of preventing jackknifing using the magnetic damping coupler 100 is described with reference to FIGS. 11A and 11B. As shown in FIG. 11A, first, the sign of the steering angle of the tractor 10 and the sign of the steering angle of the trailer 20 may be compared (S10). In response to determining that the sign of the steering angle of the tractor 10 and the sign of the steering angle of the trailer 20 are the same, the sign of the steering angle of the tractor 10 and the sign of the steering angle of the trailer 20 may be compared again.

In response to determining that the sign of the steering angle of the tractor 10 and the sign of the steering angle of the trailer 20 are different in step S10, the magnetic damping coupler 100 may be entered into the damping-ready mode (S11)> Next, whether the angular acceleration of the trailer 20 is greater than the angular acceleration of the tractor 10 may be determined (S12). In response to determining that the angular acceleration of the trailer 20 is less than the angular acceleration of the tractor 10, the magnetic damping coupler 100 may be maintained in the damping-ready mode.

In particular, whether the sign of the steering angle of the tractor 10 is (+) may be determined (S13). When the sign of the steering angle of the tractor 10 is (+), a critical current set to have minimum intensity may be applied to the first left coil 126a (S14), and when sign of the steering angle of the tractor 10 is (−), the critical current may be applied to the first right coil 126c (S15). In response to determining that the angular acceleration of the trailer 20 is greater than the angular acceleration of the tractor 10 in step S12, whether the wheels of the tractor 10 are locked may be determined (S16). In response to determining that the wheels of the tractor 10 are not locked, the magnetic damping coupler 100 may enter into the damping-normal mode (S17).

Next, the difference between the angular acceleration of the tractor 10 and the angular acceleration of the trailer 20 may be calculated (S18), and the currents that are applied to the electromagnetic coils 126 may be adjusted in proportion to the difference between the angular acceleration of the tractor 10 and the angular acceleration of the trailer 20. The difference between the angular accelerations of the tractor 10 and the trailer 20 may be determined as a first ratio, a second ratio, a third ratio, and a fourth ratio based on the acceleration of the tractor 10. Comparing the magnitudes of the ratios, "first ratio >second ratio >third ratio >fourth ration" is satisfied.

Figure 11B:
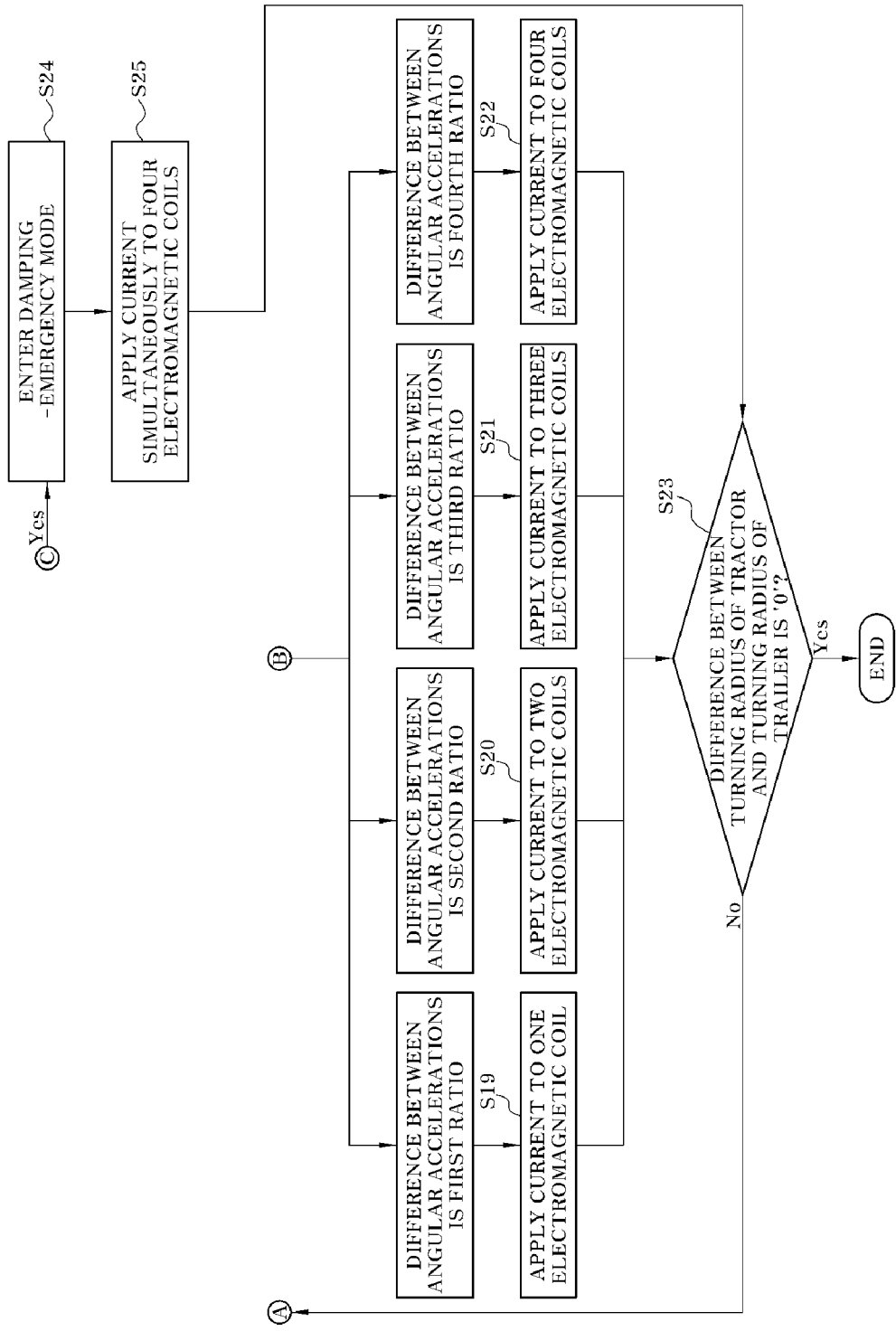

As shown in FIG. 11B, when the difference between the angular accelerations of the tractor 10 and the trailer 20 is the first ratio, a current may be applied to only one electromagnetic coil (S19). In particular, a current may be applied to one of the first left coil 126a and the first right coil 126c. When the difference between the angular accelerations of the tractor 10 and the trailer 20 is the second ratio, a current may be applied to two electromagnetic coils (S20). In particular, a current may be applied to the first left coil 126a and the second left coil 126b or a current may be applied to the first right coil 126c and the second right coil 126d based on the turning direction of the tractor 10.

When the difference between the angular accelerations of the tractor 10 and the trailer 20 is the third ratio, a current may be applied to three electromagnetic coils (S21). In particular, a current may be applied to the first left coil 126a, the second left coil 126b, and the second right coil 126d or a current may be applied to the first right coil 126c, the second right coil 126d, and the second left coil 126b based on the turning direction of the tractor 10. When the difference between the angular accelerations of the tractor 10 and the trailer 20 is the fourth ratio, a current may be applied to all of the four electromagnetic coils 126 (S22).

After a current is applied to the electromagnetic coils in accordance with the difference between the angular accelerations of the tractor and the trailer, as described above, it may be determined whether there is a difference between the turning radius according to the sign of the steering angle of the tractor 10 and the turning radius according to the wheel speed information of the trailer 20 (S23). When there is no difference between the turning radius of the tractor 10 and the turning radius of the trailer 20, the adjustments of the currents that are applied to the electromagnetic coils 126 may be finished. When there is a difference between the turning radius of the tractor 10 and the turning radius of the trailer 20, step S12 may be performed.

Further, in response to determining that wheel-locking of the tractor has occurred in step S16, the magnetic damping coupler 100 may be entered into the damping-emergency mode (S24). When the magnetic damping coupler 100 enters the damping-emergency mode, a driving current with maximum intensity may be applied simultaneously to the four electromagnetic coils 126 disposed in the piston 120 (S25). While the driving current with maximum intensity is applied to the four electromagnetic coils 126, it may be determined in real time whether there is a difference between the turning radius according to the sign of the steering angle of the tractor 10 and the turning radius according to the wheel speed information of the trailer 20 (S23).

Similar to the case in which the magnetic damping coupler 100 enters the damping-normal mode, adjusting the currents that are applied to the electromagnetic coils may be finished when there is no difference between the turning radius according to the sign of the steering angle of the tractor 10 and the turning radius according to the wheel speed information of the trailer 20. When there is a difference between the turning radius of the tractor 10 and the turning radius of the trailer 20, step S12 may be performed.

Although exemplary embodiments of the present disclosure were described above, the scope of the present disclosure is not limited to the exemplary embodiments, and various changes and modifications by those skilled in the art using the spirit of the present disclosure defined in the following claims are also included in the scope of the present disclosure.

What is claimed is:

1. A device for preventing jackknifing using a magnetic damping coupler of a tractor, comprising:
   a coupler body disposed on a tractor and having a guide king pin of a trailer inserted therein;

a cylinder disposed in the coupler body and filled with Magneto-Rheological (MR) fluid;

a piston disposed in the cylinder to be able to be fastened to the guide king pin, having a flow aperture in which the MR fluid flows, and having electromagnetic coils that generate magnetic fields in the flow aperture when a current is applied; and a controller configured to apply a current to at least one of the electromagnetic coils in response to determining that jackknifing of the tractor and the trailer has occurred.

2. The device of claim 1, wherein the cylinder is formed in a semicircular shape that extends around the guide king pin inserted in the coupler body.

3. The device of claim 1, wherein the piston includes a coupling aperture in which a fastening pin of the guide king pin is inserted, and when the trailer turns, the piston rotates with the guide king pin about the guide king pin.

4. The device of claim 1, wherein the electromagnetic coils are arranged linearly along the flow aperture of the piston.

5. The device of claim 4, wherein the electromagnetic coils include a first left coil disposed at a left side in the piston, a first right coil disposed at a right side in the piston, a second left coil disposed between the first left coil and the first right coil, and a second right coil disposed between the second left coil and the first right coil.

6. The device of claim 5, wherein a trailer steering angle sensor configured to detect a steering angle of the trailer due to rotation of the guide king pin is disposed at the coupler body, and a tractor steering angle sensor configured to detect a steering angle of the tractor is disposed at the tractor.

7. The device of claim 6, wherein when a turning direction according to a sign of the steering angle of the tractor and a turning direction according to a sign of the steering angle of the trailer are different, the controller is configured to predict that jackknifing will occur, and apply a predetermined critical current to one electromagnetic coil disposed in an opposite direction to the turning direction of the tractor of the electromagnetic coils.

8. The device of claim 6, wherein when a turning direction according to a sign of the steering angle of the tractor and a turning direction according to a sign of the steering angle of the trailer are different and angular acceleration of the trailer is greater than angular acceleration of the tractor, the controller is configured to determine that jackknifing has occurred, and apply a driving current to one or more of the electromagnetic coils.

9. The device of claim 8, wherein the controller is configured to determine the number of electromagnetic coils to which a current is applied based on a difference between the angular acceleration of the tractor and the angular acceleration of the trailer.

10. The device of claim 9, wherein when a current is applied to two or more electromagnetic coils, the controller is configured to sequentially apply a current from an electromagnetic coil disposed at the outermost side of electromagnetic coils disposed in an opposite direction to the turning direction of the tractor.

11. The device of claim 6, wherein when a turning direction according to a sign of the steering angle of the tractor and a turning direction according to a sign of the steering angle of the trailer are different, angular acceleration of the trailer is greater than angular acceleration of the tractor, and wheels of the tractor are locked, the controller is configured to determine that maximum jackknifing has occurred, and apply a current simultaneously to all of the electromagnetic coils disposed in the piston.

12. The device of claim 8, wherein in response to determining that there is no difference between the turning direction according to the sign of the steering angle of the tractor and the turning direction according to wheel speed information of the trailer, the controller is configured to stop supplying a current to the electromagnetic coils.

13. The device of claim 11, wherein in response to determining that there is no difference between a turning direction according to a sign of the steering angle of the tractor and a turning direction according to wheel speed information of the trailer, the controller is configured to stop supplying a current to the electromagnetic coils.

14. The device of claim 10, when the tractor turns left, the controller is configured to apply a current to the first right coil first and then sequentially apply a current to the second right coil, the second left coil, and the first left coil.

15. The device of claim 10, when the tractor turns right, the controller is configured to apply a current to the first left coil first and then sequentially apply a current to the second left coil, the second right coil, and the first right coil.

* * * * *